(Model.)

A. WAGNER.
LENS FOR OPTICAL INSTRUMENTS.

No. 326,255. Patented Sept. 15, 1885.

WITNESSES
Jno. N. Rosenbaum
Martin Petry.

INVENTOR
Anton Wagner
By his Attorneys
Goepel & Raegener

UNITED STATES PATENT OFFICE.

ANTON WAGNER, OF PHILADELPHIA, PENNSYLVANIA, ASSIGNOR TO JOHN L. BORSCH, OF SAME PLACE.

LENS FOR OPTICAL INSTRUMENTS.

SPECIFICATION forming part of Letters Patent No. 326,255, dated September 15, 1885.

Application filed May 1, 1885. (Model.)

*To all whom it may concern:*

Be it known that I, ANTON WAGNER, of Philadelphia, in the county of Philadelphia and State of Pennsylvania, have invented certain new and useful Improvements in Lenses for Optical Instruments, of which the following is a specification.

This invention has reference to an improved lens for spectacles and other optical instruments; and the invention consists of an optical lens that is ground to a greater degree of curvature at its shorter meridian or axis and to a lesser degree of curvature at its longer meridian or axis, either to a convex or concave surface, according as the lens is intended to magnify or diminish.

Figure 1:
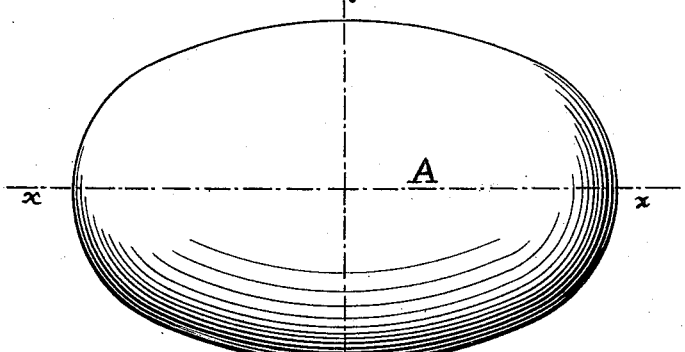
Figure 2:
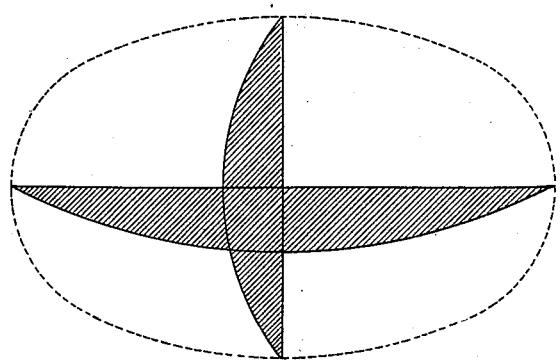
Figure 3:
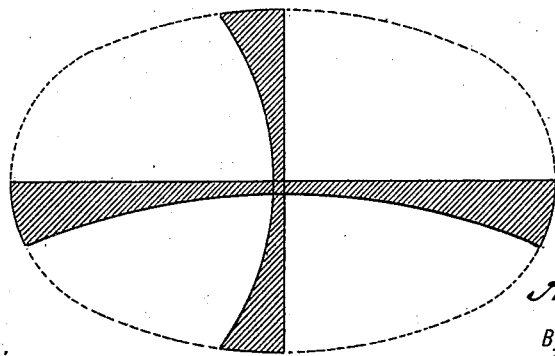

In the accompanying drawings, Figure 1 represents a front elevation of my improved lens for optical purposes. Figs. 2 and 3 are axial sections taken at right angles to each other on lines $x$ $x$ and $y$ $y$, Fig. 1, respectively, on a lens with a convex and with a concave surface.

Similar letters of reference indicate corresponding parts.

In the drawings, A represents a lens for spectacles and other optical purposes designed to be used for correcting imperfect vision. The lens A is ground at one side in such a manner that the radius of the shorter axis or meridian is smaller than the radius of the longer axis or meridian, whereby a greater degree of curvature is produced in the direction of the shorter axis than in the direction of the longer axis. The result is an elliptical lens the surface of which is ground either convex or concave, but with two different radii for the different axes of the lens. The radius of the shorter meridian may be, for instance, twelve feet, while the radius of curvature of the longer meridian is twenty feet. A lens is thereby obtained that magnifies or diminishes to a greater degree on the meridian of the shorter axis than on the meridian of the longer axis. The other surface of the lens may be ground either plano convex, concave, conical, elliptical, cylindrical, prismatic, or otherwise, according to the combination that is desired to be made with the front surface. A lens is thereby obtained that corresponds in a higher degree than the lenses heretofore in use to the peculiar shape of the eye, and which is thereby better adapted to correct the imperfect vision of the same.

Having thus described my invention, I claim as new and desire to secure by Letters Patent—

1. A lens for optical purposes the surface of which has a greater degree of curvature in the direction of one axis than in the direction of the other axis, substantially as set forth.

2. A lens for optical purposes the surface of which is ground in the direction of one axis to a smaller radius than in the direction of the other axis, substantially as set forth.

3. A lens for optical purposes the surface of which is ground with a greater degree of curvature at the shorter axis or meridian and with a smaller degree of curvature in the direction of the longer axis, substantially as set forth.

In testimony that I claim the foregoing as my invention I have signed my name in presence of two subscribing witnesses.

ANTON WAGNER.

Witnesses:
  CARL KARP,
  SOL. N. ROSENBAUM.